United States Patent [19]

Shimoni et al.

[11] Patent Number: 4,570,224

[45] Date of Patent: Feb. 11, 1986

[54] COMBINING REBINNED AND UNREBINNED PARALLEL RAY DATA WITH UNEQUAL LATERAL SPACING TO CREATE TOMOGRAPH IMAGES

[75] Inventors: Yair Shimoni, Jerusalem; Zvi Netter; Carl R. Crawford, both of Haifa, all of Israel

[73] Assignee: Elscint, Inc., Ill.

[21] Appl. No.: 445,191

[22] Filed: Nov. 29, 1982

[51] Int. Cl.$^4$ .................. G06F 15/42; A61B 6/02; G01T 1/29; G01N 23/04

[52] U.S. Cl. .................................... 364/414; 378/901

[58] Field of Search .......................... 364/414; 378/901

[56] References Cited

U.S. PATENT DOCUMENTS

| | | | |
|---|---|---|---|
| Re. 30,947 | 5/1982 | Boyd | 364/414 |
| 4,075,492 | 2/1978 | Boyd et al. | 250/385 |
| 4,352,021 | 9/1982 | Boyd et al. | 378/12 |

OTHER PUBLICATIONS

Brooks, R. A. et al., "Beam Hardening in X-ray Reconstructive Tomography," *Physics in Medicine and Biology*, vol. 21, No. 3, May 1976, 390-398.

Chase, R. C. et al., "An Improved Image Algorithm for CT Scanners", *Medical Physics*, vol. 5, No. 6, Nov./Dec. 1978, 497-499.

Crawford, C. R. et al., "Aliasing Artifacts in Computerized Tomography", *Applied Optics*, vol. 18, No. 21, Nov. 1979, 3704-3711.

Nahamoo, D. et al., "Design Constraints and Reconstruction Algorithms for Traverse-Continuous-Rotate CT Scanners," *IEEE Transactions on Biomedical Engineering*, vol. BME-28, No. 2, Feb. 1981, 79-98.

Spital, R. D. "Beam Hardening Artifacts in Computerized Tomography," Proceedings of the Seventh New England (Northeast) Bioengineering Conference, Mar. 1979, 347-350.

Joseph, P. M. et al., "The Effects of Scatter in X-ray Computed Tomography", *Medical Physics*, vol. 9, No. 4, Jul./Aug. 1982, 464-472.

Glover, G. H. "Compton Scatter Effects in CT Reconstruction", *Medical Physics*, vol. 9, No. 6, Nov./Dec. 1982, 860-867.

Yaffe, M. J. et al., "Scattered Radiation in Diagnostic Radiology: Magnitudes, Effects and Methods of Reduction", *Journal of Applied Photographic Engineering*, vol. 9, No. 6, Dec. 1983, 184-195.

*Primary Examiner*—Jerry Smith
*Assistant Examiner*—Clark A. Jablon
*Attorney, Agent, or Firm*—Sandler & Greenblum

[57] ABSTRACT

Equipment and methods are presented for rearranging divergent beam derived data into parallel data to enable decreasing the number of preprocessing computations and improving the quality of the resulting tomograph. The equipment and method comprise means and steps which vary the spacing of at least portions of the resulting parallel projections, so that when the parallel projections with varied spacings are combined with the parallel projections that have not had their spacing varied, the cupping artifacts normally present when using projections obtained from rearranging are cancelled.

22 Claims, 6 Drawing Figures

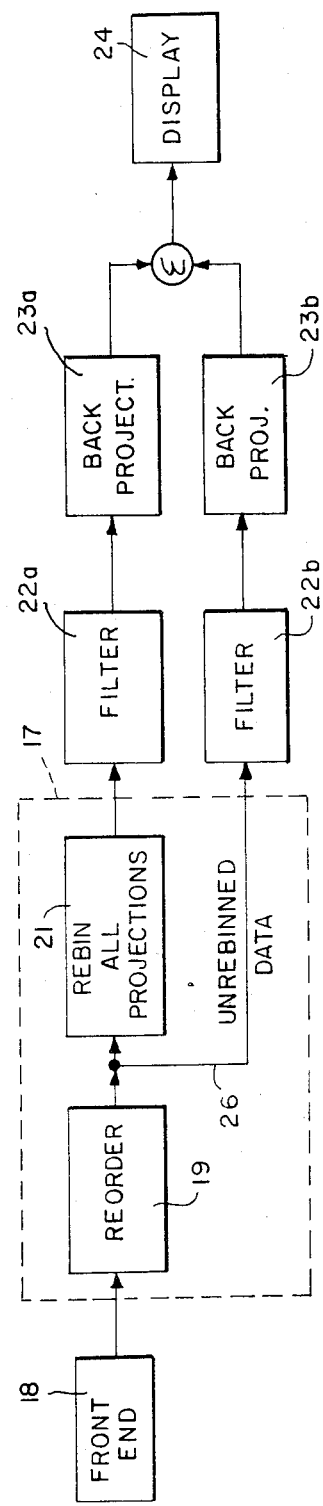
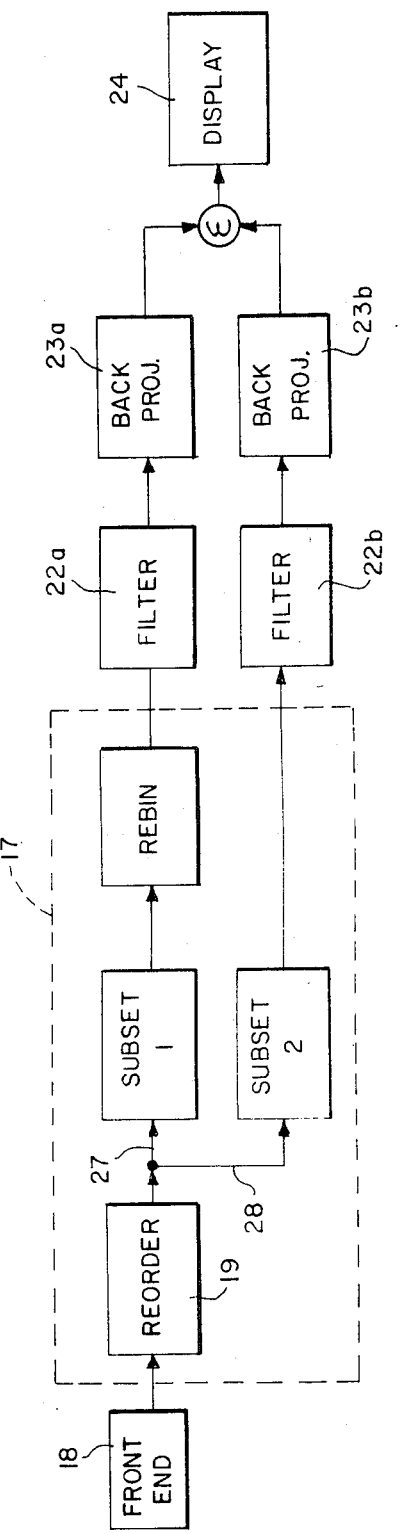

COMBINING REBINNED AND UNREBINNED PARALLEL RAY DATA WITH UNEQUAL LATERAL SPACING TO CREATE TOMOGRAPH IMAGES

FIELD OF THE INVENTION

This invention relates to divergent beam radiation tomography and more particularly to methods for rearranging such divergent beams to facilitate their use in tomography.

BACKGROUND OF THE INVENTION

Medical imaging apparatus such as CT Scanners use a plurality of processors to obtain the desired tomograph. The scientists who design such equipment are continuously seeking ways and means for reducing the quantity of computations required to obtain the tomograph, while maintaining high picture quality of good resolution with minimal artifacts. Such designers are continuously compromising between quantity of computations required and the quality of the tomograph.

Examples of such comprises are found, for example, in U.S. Pat. Nos. Re. 30,947 and 4,075,492, which are also concerned with CT Scanners using fan or divergent beams. Rather than proceeding with the significantly greater number of computations, required with divergent beams, the patents offer the compromise solution of reordering the divergent rays of the fan beam to parallel rays. However, the spacing between rays obtained by the reordering process in laterally unequal. The unequal spacing results in artifacts (diminution of picture quality).

To remove the artifacts, the Re. 30947 patent teaches interpolation of all the shadowgram data to "reposition" the parallel rays to laterally equal spacing. The patented system performs significantly fewer computations than would be required if the back-projection reconstruction used the original divergent beams. However, the process still requires a great number of computations.

SUMMARY OF PRESENT INVENTION

Accordingly, the present invention provides a method of rearranging divergent beam-derived data using fewer computations while nonetheless improving the quality of the resulting tomograph. The inventive method includes the steps of:

a. directing divergent beams of penetrating radiation through a body being examined from source means on one side of said body, b. angularly displacing the divergent beam relative to the body, c. detecting radiation that has passed through the body at a number of angularly spaced positions within the angle subtended by the divergent beams to derive sets of detected radiation data representative of a plurality of angularly spaced shadowgrams indicative of the absorption of the radiation by different portions of the body, d. reordering the sets of detected radiation data from sets of data corresponding to divergent projections to sets of data corresponding to parallel projections, the spacing between rays in said parallel projections being laterally unequal.

e. rebinning all or a portion of the sets of data corresponding to said parallel projections to form another set of parallel laterally unequally spaced projections with the unequal lateral spacing chosen to compensate for artifacts normally caused by the original unequally laterally spaced parallel projections, and f. combining the non-rebinned portions and the rebinned portions to form a tomographic image by back-projecting.

In a preferred embodiment the original unequal lateral spacing generally follows a cosine function. The rebinned projections are spaced apart following a "reflection" of the cosine function.

Thus the method operates on only a portion of the reordered divergent projections but none the less provides a tomograph with image quality equivalent to tomographs obtained in the prior art when performing an equivalent number or even greater number of computations.

BRIEF DESCRIPTION OF THE DRAWINGS

Other features and advantages of the present invention will become more apparent from the description that follows taken in conjunction with the attached drawings showing the apparatus required to implement the present invention, wherein

FIGS. 2, 3 and 4 show different embodiments of details of the block diagram of FIG. 1.

DETAILED DESCRIPTION

Figure 1:
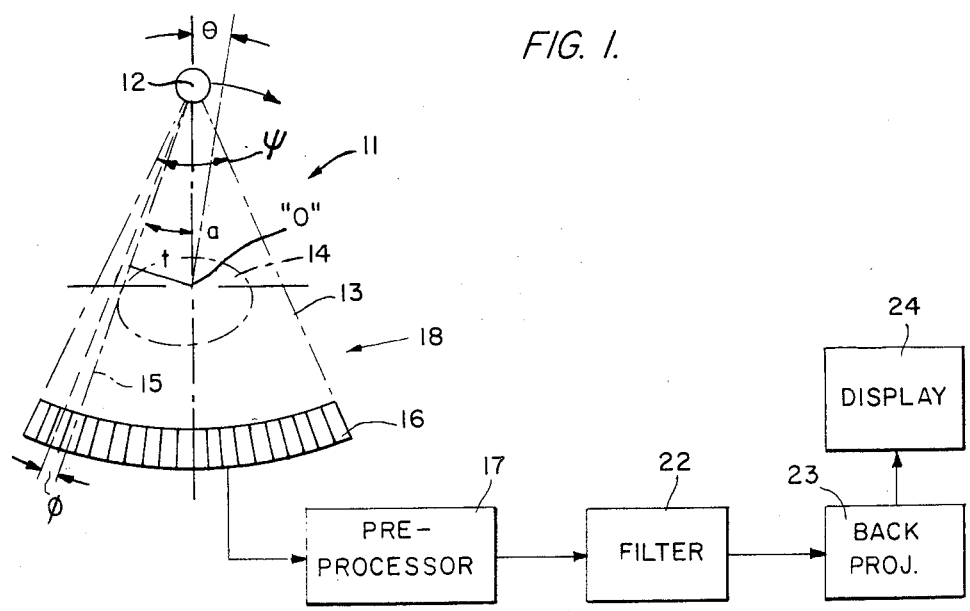
FIG. 1 is a pictorial block diagram showing a CT Scanner using a divergent ray source and equipped to perform the inventive method.

A typical fan or divergent beam source 12 is shown in the CT Scanning equipment 11 of FIG. 1. The divergent beam shown as 13 goes through a body 14. The beam is angularly displaced relative to the body by moving the source 12. Shadowgram data is taken in angular steps shown as the angle "theta" in the example.

In a preferred embodiment the radiation that has passed through the body is detected by an array of angularly spaced detectors 16 located within the angle "psi" subtended by the divergent beam. However, the array need not be restricted to the angle "psi" for purposes of the invention. This condition provides for an embodiment in which different sets of detectors are used for each fan-beam projection.

The detectors are used to derive sets of angularly spaced shadowgrams which indicate the absorption of radiation by different parts of the body. Equivalently the vertex of the fan can be either the source of radiation or individual detectors.

Figure 1A:
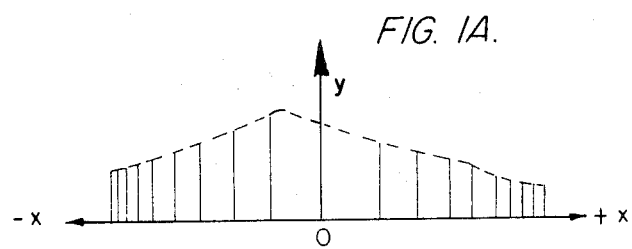
FIG. 1A is a diagram showing the lateral spacing between parallel projections after reordering.

The sets of detected radiation data are reordered in preprocessor 17 to, among other things, change the fan-beam projections to parallel projections. The reordering is accomplished in any manner well known to those skilled in the art. The reordered data provides projections which have samples corresponding to rays that are parallel, but the lateral spacing between the rays is unequal. The spacing in the preferred embodiment generally follows a cosine function, such as shown in FIG. 1A.

The data in preprocessor 17 is further manipulated to reduce artifacts even while performing a minimum number of computations.

Figure 4:
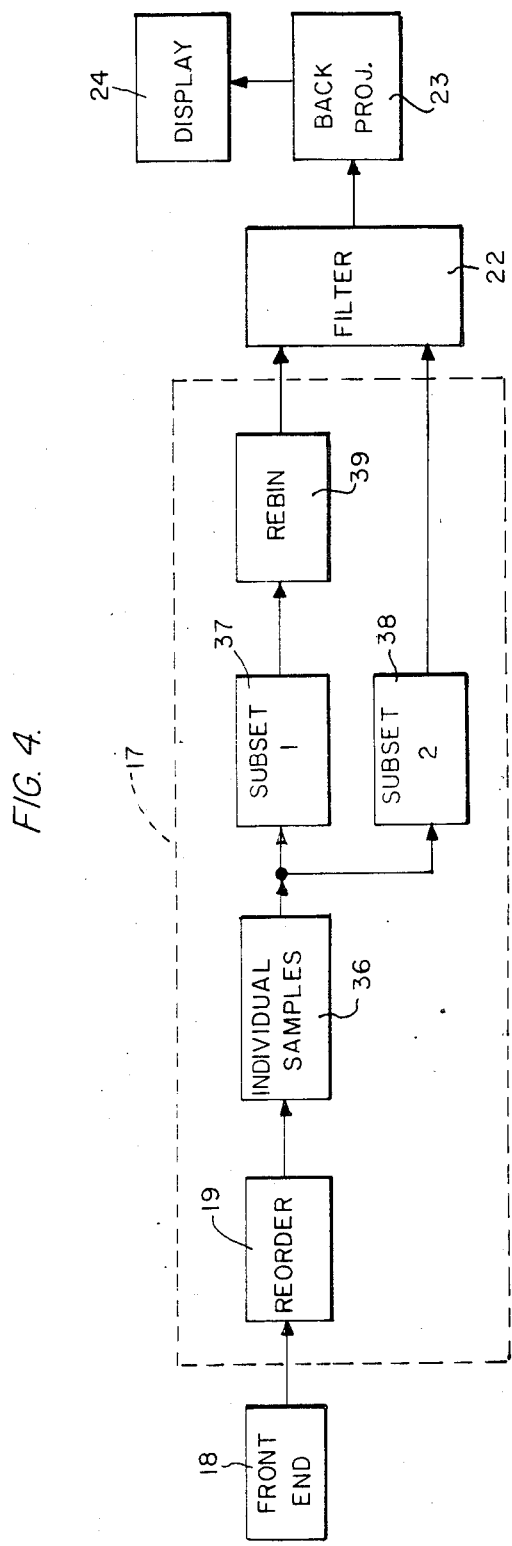

More details of preprocessing stage 17 are shown in FIGS. 2, 3, and 4. As indicatd therein, the sets of divergent shadowgram data received from the front end detection system 18 are first reordered, as indicated by block 19, into sets of shadowgram data corresponding to absorption shadowgrams of parallel rays. In block 21, the rebinning operates on the projection data to reduce artifacts. The rebinned data is filtered as indicated by filter means 22a. Filter means 22a and 22b could be obtained with only one unit instead of the two units depicted in FIGS. 2 and 3. The filtered rebinned and unrebinned data are separately back-projected by back-projection means 23a and 23b to provide images that are "averaged" in a display device 24. Back-projection means 23a and 23b could be obtained with only one unit instead of the two units depicted in FIGS. 2 and 3.

The rebinning means 21, in the embodiment shown in FIG. 2, processes all the data to generate laterally unequally spaced data of the type to act with the original data provided at line 26 to cancel out the artifacts normally caused by the unequal lateral spacing. Thus, when the lateral spacing of the original data follows a cosine law the lateral spacing of the rebinned data follows an "inverse" cosine. The cosine and inverse cosine are typified in FIG. 5.

In a preferred embodiment shown in FIG. 3 only a portion of the data is rebinned. For example, the even parallel projections on line 27 are rebinned while the odd parallel projections on line 28 are left in the laterally unequally spaced condition in which they arrive from the reordering means 19. Both the rebinned and unrebinned data are filtered at 22 and used by the back-projector to obtain the tomograph on display means 24.

In the embodiment shown in FIG. 4, the preprocessor reorders the data to obtain parallel projections from the divergent projections. Then the individual shadowgrams are further processed. More particularly, the individual samples 36 from the individual shadowgrams are rebinned to cancel out or minimize artifacts.

In one embodiment the individual samples 36 from the detectors are subdivided into two sets 37 and 38. One set is rebinned at 39 to be a "reflection" of the unrebinned set in a manner analagous to the rebinning operations of FIG. 3.

Figure 5:
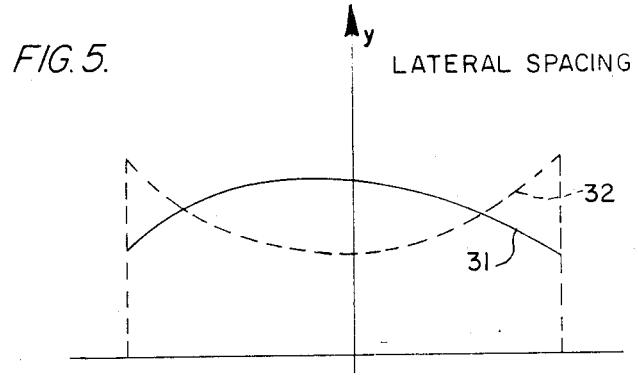
FIG. 5 demonstrates results of the rebinning and combining process of at least one preferred embodiment of the invention.

FIG. 5 shows the spacing of the unrebinned data following a cosine function shown at 31, while the rebinned data which follows a "reflection" of the cosine function is shown at 32. The results are that fewer computations are required in the preprocessing stage and relatively artifact-free tomographs are obtained.

The rearranging algorithm described in the prior art can be segmented into two steps: reordering and rebinning. The former step results in parallel projections that contain samples that are unequally laterally spaced. Tomographic reconstructions from data obtained at this stage yield images that contain a low-frequency error term. The rebinning step transforms the samples in each parallel projection so that equally laterally spaced parallel projections are obtained. Reconstruction made with this projection set are without the low-frequency error term.

The improvement over the prior art, U.S. Pat. No. Re. 30,947, can be shown as follows. Consider the sampling intervals of the unrebinned data. In FIG. 1 let the straight line passing through the vertex of the divergent fan and the origin of the scan be called the "center line". Let Line 15 be a ray connecting the source and a detector. Let "a" be the angle that is subtended by this ray with the "center line". Let "R" denote the distance from the origin, "O", of the scan system to the vertex of the fan. Let "t" be the perpendicular distance from "O" to Line 15. It is given by:

$$t = R^* \sin(a). \qquad (Eq. 1)$$

In a real system there exists a finite number of discrete rays. Assume that there are "N" rays. The angle of each ray is denoted as "a(i)", where i=1,2, ... N. In a preferred embodiment, the angle between adjacent rays is a constant. Thus:

$$a(i+1) - a(i) = d\_a, \qquad (Eq. 2)$$

where "d_a" is a constant. The samples of the parallel projections that are obtained after reordering are located at the positions given by:

$$t(i) = R^* \sin(a(i)), \qquad (Eq. 3)$$

where we have assumed for the purposes of this example that the angle between source positions is also given by "d_a". The distance between adjacent samples in the parallel projection, "d_t(i)", is given by:

$$d\_t(i) = t(i+1) - t(i). \qquad (Eq. 4)$$

"d_t(i)" can be evaluated by substituting (2) and (3) into (4). The result is:

$$\begin{aligned} d\_t(i) &= R * \sin(a(i+1)) - \sin(a(i)) \\ &= R * \sin(a(i) + d\_a) - \sin(a(i)) \\ &= R * \sin(a(i)) * \cos(d\_a) + \\ &\qquad\qquad \cos(a(i)) * \sin(d\_a) - \sin(a(i)) \\ &= R * d\_a * \cos(a(i)). \end{aligned} \qquad (Eq. 5)$$

where "d_a" is small enough so that:

$$\cos(d\_a) 1$$

and $$\sin(d\_a) d\_a.$$

If the rearranging method is implemented without the rebinning step, then the cosine term in (5) leads to the aforementioned low-frequency error term in the resulting tomogram. The low-frequency error term results in a cupping artifact that is well known in tomographic imaging.

The new rebinning described in this invention also results in parallel projections with unequal lateral spacing. Assume that the distance between adjacent samples in the unrebinned data set is given by "d_t(i)". Consider the case where "d_t(i)", the intersample distance in a rebinned data set, is given by the "reflection" or "negative" of the original intersample distances. Thus:

$$d\_t'(i) = c - d\_t(i), \qquad (Eq. 6)$$

where "c" is a constant chosen so that the average intersample distance in the unrebinned and rebinned data are approximately equal.

If this new rebinning method is applied to all of the parallel projections, an image with another form of low-frequency error term is obtained. This error is also a cupping artifact, however, it is upside down with respect to the original cupping artifact. Averaging the two images with the opposite cupping artifacts causes the artifacts to cancel each other and yield an image free of cupping artifacts. However, as presented here, this method is relatively slow. The above method can be speeded up so that a faster algorithm can be obtained. The faster method follows the steps of:

a. reordering the divergent fan beam data so that unequally laterally spaced parallel projections are obtained;

b. segmenting the parallel projections into two sets, one set containing all of the even-numbered projections and the other set all of the odd-numbered projections;

c. rebinning only one projection set so that the intersample distance is given by (6);

d. filtering all of the projections;

e. back-projecting all of the filtered projections; and f. displaying the resulting image.

In the above method, step c is twice as fast as the equivalent step in the referred to prior art. Because step b takes negligible time, this new method is faster than the method presented in the prior art.

The invention as described herein can be carried out using variations and permutations of the above six step method. For example, separate filters can be used for each of the subsets. In addition, the "averaging" of the different subsets can be accomplished by separately back-projecting the filtered subsets. Another variation in the six step method described above replaces steps c and d by a step that includes:

rebinning each parallel projection to distances given alternately by equations (5) and (6).

It is believed that the advantages and improved results furnished by the apparatus and methods of the present invention are apparent from the foregoing descriptions of the invention, and that various changes may be made without departing from the spirit and scope of the invention as sought to be defined in the claims that follow:

What is claimed is:

1. A method of rearranging divergent beam derived data to obtain tomographic images with minimum artifacts, said method being amenable to fast processing, the method including the steps of:

a. directing divergent beams of penetrating radiation through a body being examined from source means on one side of said body, b. angularly displacing the divergent beam relative to the body, c. detecting radiation that has passed through the body at a number of angularly spaced positions within the angle subtended by the divergent beams to derive sets of detected radiation data representative of a plurality of angularly spaced shadowgrams indicative of the absorption of the radiation by different portions of the body, d. reordering the sets of detected radiation data from sets of data corresponding to divergent projections to sets of data corresponding to parallel projections, the spacing between samples in said parallel projections being laterally unequal, e. rebinning at least a portion of the sets of data corresponding to said parallel projections to form another set of parallel projections also being unequally spaced with the spacing selected to compensate for artifacts normally caused by the unequal lateral spacing of the parallel projections, and f. combining the unrebinned and rebinned portions to form tomographic images by back-projecting.

2. The method of claim 1 wherein said unequal lateral spacing of said reordered sets substantially follows a cosine law.

3. The method of claim 2 wherein said rebinning comprises the step of:

setting the lateral spacing of the other set of parallel projections to substantially follow an "inverse" cosine law.

4. The method of claim 1,2, or 3 including the steps of:

a. rebinning all of the sets of data corresponding to said parallel projections to form another set of parallel projections also being unequally laterally spaced with the lateral spacing selected to compensate for artifacts normally caused by the unequal lateral spacing of the parallel projections, and b. combining the non-rebinned parallel projections with the other set of parallel projections to form tomographic images by back-projecting.

5. The method of claim 4 including the step of filtering prior to back-projecting.

6. The method of claim 5 wherein the rebinned and the unrebinned sets or portions of sets of parallel projections are separately filtered.

7. The method of claim 5 wherein the filtered rebinned and filtered unrebinned parallel projections are combined during the back-projecting step.

8. The method of claim 1 wherein the rebinning is performed on samples comprising the individual parallel projections.

9. The method of claim 8 including the step of rebinning each of said parallel projections to cause the lateral spacing between the samples in the parallel projections to be given alternatively by:

$$d\_t(i) = R*d\_a* \cos(a(i))$$

and $$d\_t(i) = c - R*d\_a* \cos(a(i)).$$

10. The method of claims 8 or 9 including the steps of:

a. rebinning all of the sets of data corresponding to said parallel projections to form sets of parallel projections also unequally laterally spaced, with the lateral spacing selected to compensate for artifacts normally caused by the unequal lateral spacing of the parallel projections, and b. combining the rebinned parallel projections to form tomographic images by back-projecting.

11. The method of claim 10 including the step of filtering prior to back-projecting.

12. Equipment for rearranging divergent beam derived data to obtain tomographic images with minimum artifacts, said equipment enabling fast processing, the equipment comprising:

a. means for directing divergent beams of penetrating radiation through a body being examined from source means on one side of said body, b. means for angularly displacing the divergent beam relative to the body, c. means for detecting radiation that has passed through the body at a number of angularly spaced positions within the angle subtended by the divergent beams to derive sets of detected radiation data representative of a plurality of angularly spaced shadowgrams indicative of the absorption of the radiation by different portions of the body, d. means for reordering the sets of detected radiation data from sets of data corresponding to divergent projections to sets of data corresponding to parallel projections, the spacing between samples in said parallel projections being laterally unequal, e. means for rebinning at least a portion of the sets of data corresponding to said parallel projections to form another set of parallel projections also being unequally laterally spaced with the lateral spacing selected to compensate for artifacts normally caused by the unequal lateral spacing of the parallel projections, and f. means for combining the unrebinned and rebinned portions to form tomographic images by back-projecting.

13. The equipment of claim 12 wherein said unequal lateral spacing of said reordered sets substantially follows a cosine law.

14. The equipment of claim 13 wherein said rebinning comprises the step of:

setting the lateral spacing of the other set of parallel projections to substantially follow an "inverse" cosine law.

15. The equipment of claims 12, 13 or 14 comprising:

a. means for rebinning all of the sets of data corresponding to said parallel projections to form another set of parallel projections also being unequally laterally spaced with the lateral spacing selected to compensate for artifacts normally caused by the unequal lateral spacing of the parallel projections, and b. means for combining the non-rebinned parallel projections with the other set of parallel projections to form tomographic images by back-projecting.

16. The equipment of claim 15 including means for filtering prior to back-projecting.

17. The equipment of claim 16 wherein the filter means comprises means for separately filtering the rebinned and the unrebinned portions of sets of parallel projections.

18. The equipment of claim 16 wherein means are provided for combining the filtered rebinned and filtered unrebinned parallel projections during back-projecting.

19. The equipment of claim 12 including means for rebinning samples of the individual parallel projections.

20. The equipment of claim 19 including the step of rebinning each of said parallel projections to cause the lateral spacing between the samples in the parallel projections to be given alternatively by:

$$d\_t(i) = R*d\_a* \cos(a(i))$$

and $$d\_t(i) = c - R* d\_a* \cos(a(i)).$$

21. The equipment of claims 19 or 20 comprising:

a. means for rebining all of the sets of data corresponding to said parallel projections to form sets of parallel projections also unequally laterally spaced, with the lateral spacing selected to compensate for artifacts normally caused by the unequal lateral spacing of the parallel projections, and b. means for combining the rebinned parallel projections to form tomographic images by back-projecting.

22. The equipment of claim 21 including means for filtering prior to back-projecting.

* * * * *